(12) United States Patent
Chin et al.

(10) Patent No.: US 8,613,138 B2  
(45) Date of Patent: Dec. 24, 2013

(54) REPAIR OF INTEGRALLY BLADED ROTORS

(75) Inventors: Herbert A. Chin, Portland, CT (US); Robert P. Schaefer, Vernon Rockville, CT (US); Eberhardt Privitzer, Los Lunas, NM (US); Wangen Lin, South Glastonbury, CT (US); Billie W. Bunting, Colchester, CT (US); James J. Moor, New Hartford, CT (US); Vincent Nevins, Chester, CT (US); Andrew L. Haynes, Glastonbury, CT (US); Greg Czeladko, Avon, CT (US); Kenneth T. Raczewski, Columbia, CT (US)

(73) Assignee: United Technologies Corporation, Hartford, CT (US)

( * ) Notice: Subject to any disclaimer, the term of this patent is extended or adjusted under 35 U.S.C. 154(b) by 449 days.

(21) Appl. No.: 12/727,472

(22) Filed: Mar. 19, 2010

(65) Prior Publication Data

US 2011/0138625 A1     Jun. 16, 2011

Related U.S. Application Data

(63) Continuation-in-part of application No. 12/639,215, filed on Dec. 16, 2009, now Pat. No. 8,479,391.

(51) Int. Cl.
    *B23P 6/00*     (2006.01)
    *B23K 20/12*     (2006.01)

(52) U.S. Cl.
    USPC ............... 29/889.1; 29/402.01; 29/402.09; 228/2.1; 228/112.1; 416/223 R

(58) Field of Classification Search
    USPC ............ 29/402.01, 402.08, 889.1, 402.09; 228/2.1, 112.1; 416/223 R
    See application file for complete search history.

(56) References Cited

U.S. PATENT DOCUMENTS

| | | | |
|---|---|---|---|
| 4,873,751 A | 10/1989 | Walker et al. | |
| 4,883,216 A * | 11/1989 | Patsfall | 228/119 |
| 5,109,606 A | 5/1992 | DeMichael et al. | |
| 5,197,190 A | 3/1993 | Coolidge | |
| 5,486,262 A * | 1/1996 | Searle | 156/580 |
| 5,755,031 A | 5/1998 | Baumgarten et al. | |
| 5,813,593 A * | 9/1998 | Galaske, Jr. | 228/112.1 |
| 5,865,364 A * | 2/1999 | Trask et al. | 228/212 |
| 6,106,233 A | 8/2000 | Walker et al. | |
| 6,219,916 B1 | 4/2001 | Walker et al. | |
| 6,244,495 B1 | 6/2001 | Rapp et al. | |
| 6,354,482 B1 | 3/2002 | Diebold et al. | |
| 6,438,838 B1 | 8/2002 | Meier et al. | |
| 6,536,110 B2 | 3/2003 | Stanley et al. | |
| 6,787,740 B2 | 9/2004 | Smith et al. | |
| 6,834,790 B2 | 12/2004 | Bagnall | |

(Continued)

*Primary Examiner* — Alexander P Taousakis

(74) *Attorney, Agent, or Firm* — Miller, Matthias & Hull LLP

(57) ABSTRACT

A method is provided for repairing a damaged rotor blade on an integrally bladed rotor by removing a damaged portion of a damaged blade leaving a blade stub extending outwardly from the disk and performing a linear friction welding operation to attach a replacement blade segment to the blade stub. The rotor may be disposed operation using a linear friction welding apparatus. The method includes disposing a support collar about the blade stub and securing the support collar to the linear friction welding apparatus prior to a commencement of the bonding operation. A lower surface of the support collar is contoured to mate with a portion of an outer circumference surface of the rotor disk.

5 Claims, 3 Drawing Sheets

(56) References Cited

U.S. PATENT DOCUMENTS

| | | | |
|---|---|---|---|
| 8,006,380 B2 * | 8/2011 | Rawson et al. | 29/889.1 |
| 2008/0244905 A1 | 10/2008 | Meier | |
| 2011/0005075 A1 * | 1/2011 | Trewiler et al. | 29/889.1 |
| 2011/0138624 A1 * | 6/2011 | Chin et al. | 29/889.1 |
| 2011/0219616 A1 * | 9/2011 | Bayer et al. | 29/889.1 |
| 2012/0148413 A1 * | 6/2012 | Richter et al. | 416/223 R |

* cited by examiner

REPAIR OF INTEGRALLY BLADED ROTORS

CROSS-REFERENCE TO RELATED APPLICATION

This application claims priority from and is a continuation-in-part of U.S. non-provisional patent application Ser. No. 12/639,215, filed Dec. 16, 2009, and entitled "CONSUMABLE COLLAR FOR LINEAR FRICTION WELDING OF BLADE REPLACEMENT FOR DAMAGED INTEGRALLY BLADED ROTORS", which application is incorporated herein by reference in its entirety.

STATEMENT OF GOVERNMENT INTEREST

The United States Government has certain rights in this disclosure pursuant to contract number F33657-03-D-0016-0010 between the United States Air Force and United Technologies Corporation.

FIELD OF THE INVENTION

This invention relates generally to integrally bladed rotors and, more particularly, to the application of linear fiction welding to the repair of damaged blades of integrally bladed rotors, particularly integrally bladed rotors of the type not originally manufactured using linear friction welding techniques.

BACKGROUND OF THE INVENTION

Gas turbine engines, such as those used to power modern commercial aircraft or in industrial applications, include a compressor for pressurizing a supply of air, a combustor for burning a hydrocarbon fuel in the presence of the pressurized air, and a turbine for extracting energy from the resultant combustion gases. Generally, the compressor, combustor and turbine are disposed about a central engine axis with the compressor disposed axially upstream of the combustor and the turbine disposed axially downstream of the combustor. For a turbofan gas turbine engine, a large diameter fan is mounted to the engine shaft forward of the compressor. Air drawn into the engine passes axially through the fan and the compressor into the combustor wherein fuel is combusted in the air to generate and accelerate combustion gases which pass through the turbine and out the exhaust nozzle of the gas turbine engine. In the turbofan version of the gas turbine engine, a portion of the air flow into the engine is delivered to the compressor to pass through the engine core, while the remainder of the air passes through a bypass duct thereby bypassing the compressor and engine core.

The compressor and the turbine modules include a plurality of stages, each stage including a plurality of blades mounted to a rotor disk mounted to a rotatable shaft. One or more stages of blades may be associated with a single rotor disc. In many gas turbine engines, the compressor and/or turbine rotors constitute integrally blade rotors (IBR) wherein the blades are machined from an oversized rotor disk forging, metallurgically joined or solid state welded to a rotor disk, rather than being mechanically secured to the rotor disk, such as by a dove-tail or fir-tree blade root fit into a correspondingly shaped slot in the rotor disk. Consequently, an integrally bladed rotor assembly is lighter than a conventional bladed root rotor assembly of comparable size.

However, rotor blades are subject in service to damage from impact by foreign objects ingested into the engine, commonly referred to as foreign object damage (FOD). Rotor blades are also subject in service to damage from impact by pieces of broken or unsecured engine parts entrained in the air flow passing through the engine, commonly referred to as domestic object damage (DOD). Because of the position at the forward end of the gas turbine engine, fan and compressor damages are particularly susceptible to foreign object damage, as well as domestic object damage from pieces of blades broken off upstream blades. While minor damage may be repaired relatively easily by a process known in the art as blending, blades that suffer significant damage from an FOD/DOD event must be replaced.

Replacement of blades on integrally bladed rotors has proven to be troublesome. In a common repair method, after an integrally bladed rotor having a damaged blade requiring replacement is removed from the engine, the damaged portion of the damaged blade is removed leaving a blade stub projecting outwardly from the rotor disk. The blade is then restored by metallurgically bonding a replacement blade section to the blade stub. Although a number of variations of the aforedescribed method for repairing a damaged blade on an integrally bladed rotor have been proposed and tried in military and commercial applications, consistently obtaining a structurally sound repair with original equipment manufacture properties has proven to be elusive. For example, U.S. Pat. Nos. 4,873,751; 5,109,606; 5,197,190; 5,755,031 and 6,536,110 disclose various techniques for repairing damaged blades of integrally bladed rotors by welding a replacement blade section to a blade stub on the rotor. U.S. Pat. No. 6,354,482 discloses a linear friction welding apparatus suitable for use in bonding an airfoil to a rotor during manufacture of an integrally bladed rotor and U.S. Pat. No. 6,244,495 discloses a gripper for use in connection with a linear friction welding apparatus.

SUMMARY OF THE INVENTION

A method is provided for repairing a damaged rotor blade on an integrally bladed rotor using a linear friction welding apparatus, the rotor having a disk and a plurality of blades extending outwardly from the disk, by removing a damaged portion of the damaged blade leaving a blade stub extending outwardly from the rotor disk and attaching an undamaged replacement blade segment to the blade stub by a bonding operation on a linear friction welding apparatus. The method includes steps of: disposing the rotor disk in a linear friction welding apparatus between a first holding portion of the linear friction welding apparatus and a second holding portion of the linear friction welding apparatus; providing a support collar defining an internal cavity adapted to receive the blade stub in supporting relationship; disposing the support collar in supporting relationship about the blade stub; and securing the support collar to the linear friction welding apparatus.

The step of securing the support collar to the linear friction welding apparatus comprises securing a first end of the support collar to the first holding portion of the linear friction welding apparatus and securing a second end of the support collar to the second holding portion of the linear friction welding apparatus. The step of disposing the support collar in supporting relationship about the blade stub may include slipping a single-piece support collar over the blade stub whereby the blade stub is received into the internal cavity of the support collar. The step of disposing the support collar in supporting relationship about the blade stub comprises assembling a two-piece collar about the blade stub whereby the blade stub is received into the internal cavity of the support collar. The method may further include providing a support collar having a lower surface contoured to mate with a portion of an outer circumferential surface of the rotor disk.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
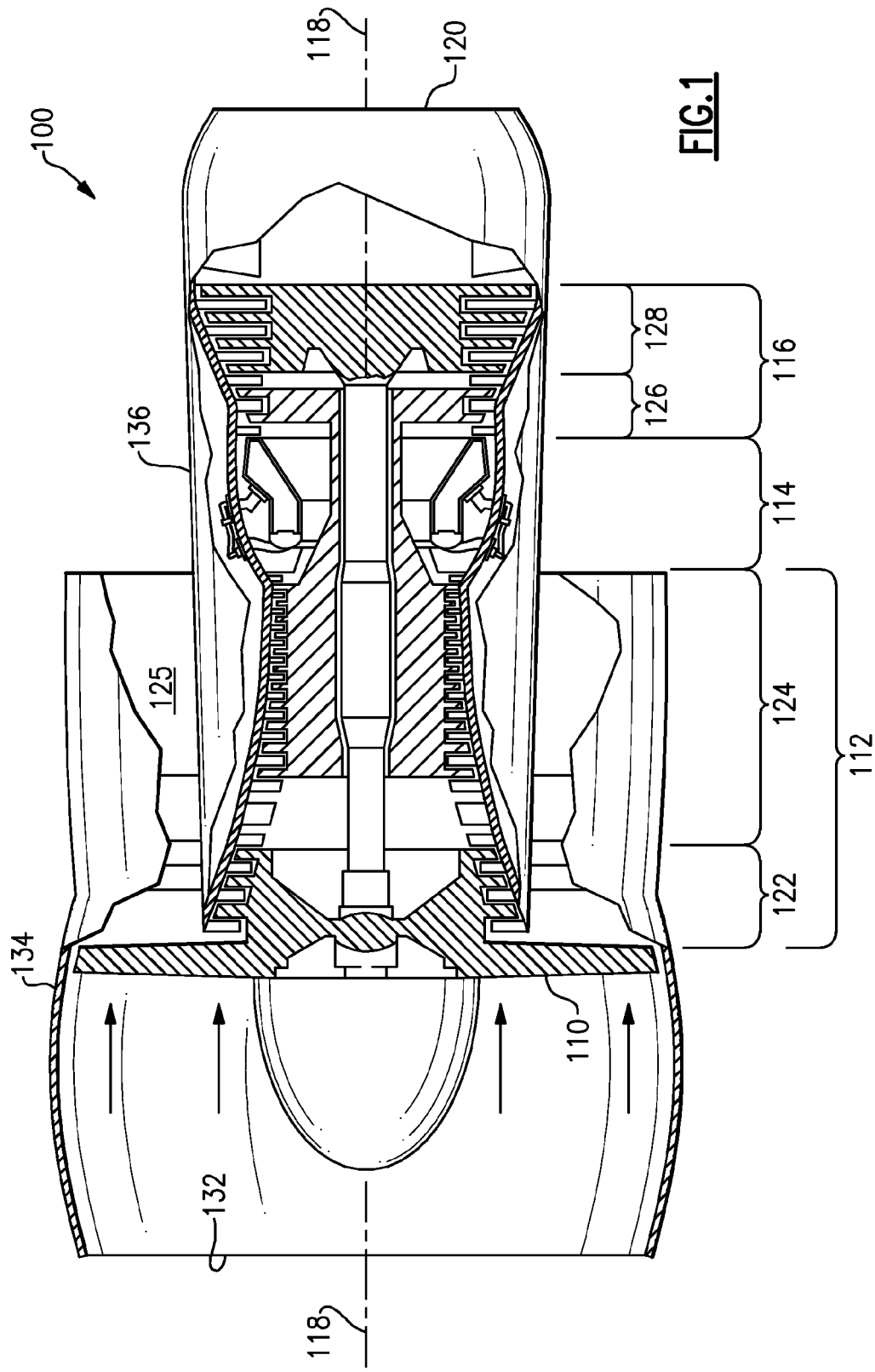
FIG. 1 is a schematic representation of a turbofan gas turbine engine.

Referring initially to FIG. 1 of the drawing, an exemplary embodiment of a turbofan gas turbine engine, designated generally as 100, is shown. The turbofan gas turbine engine 100 includes, from fore-to-aft, a fan 110, a compressor 112, a combustor 114, and a turbine 116 disposed along a longitudinal axis 118. A nacelle forms a housing or wrap that surrounds the gas turbine engine 100 to provide an aerodynamic housing about the gas turbine engine. In the turbofan gas turbine engine 100 depicted in the drawings, the nacelle includes, from fore to aft, the engine inlet 132, the fan cowl 134, the engine core cowl 136 and the primary exhaust nozzle 120.

In operation of the turbofan gas turbine engine, a portion of the air entering through the engine inlet 132 passes through the compressor 112 and another portion of the air passes though the fan duct 125 defined between the fan cowl 134 and the engine core cowl 136. In the combustor 114, fuel is combusted in compressed air from the compressor 112 thereby generating and accelerating high-temperature combustion exhaust gases, which pass through the turbine 116. In the turbine, energy is extracted from the combustion exhaust gases to turn the turbine 116 to drive the compressor 112 and fan 110, and also to produce thrust.

The compressor 112 may include a low pressure compressor 122 and a high pressure compressor 124. The turbine may include a high pressure turbine 126 and a low pressure turbine 128. The fan 110 and the low pressure compressor 122 are mounted to a common shaft with the low pressure turbine 128 and are driven by the low pressure turbine. The high pressure compressor 124 is mounted to a common shaft with the high pressure turbine 126 and is driven by the high pressure turbine 126.

The fan 110 includes a rotor assembly formed of a row of a plurality of circumferentially spaced fan blades extending outwardly from a fan rotor disk. The low pressure compressor 122 and the high pressure compressor 124 include a plurality of compressor stages. Each compressor stage includes a stator section formed by a row of a plurality of circumferentially spaced stationary vanes followed by a rotor assembly formed by a row of a plurality of circumferentially spaced compressor blades extending outwardly from a rotor disk. The rotor assemblies of the fan 110 and the low pressure compressor 122 and the high pressure compressor 124 may comprise integrally bladed rotors.

Figure 2:
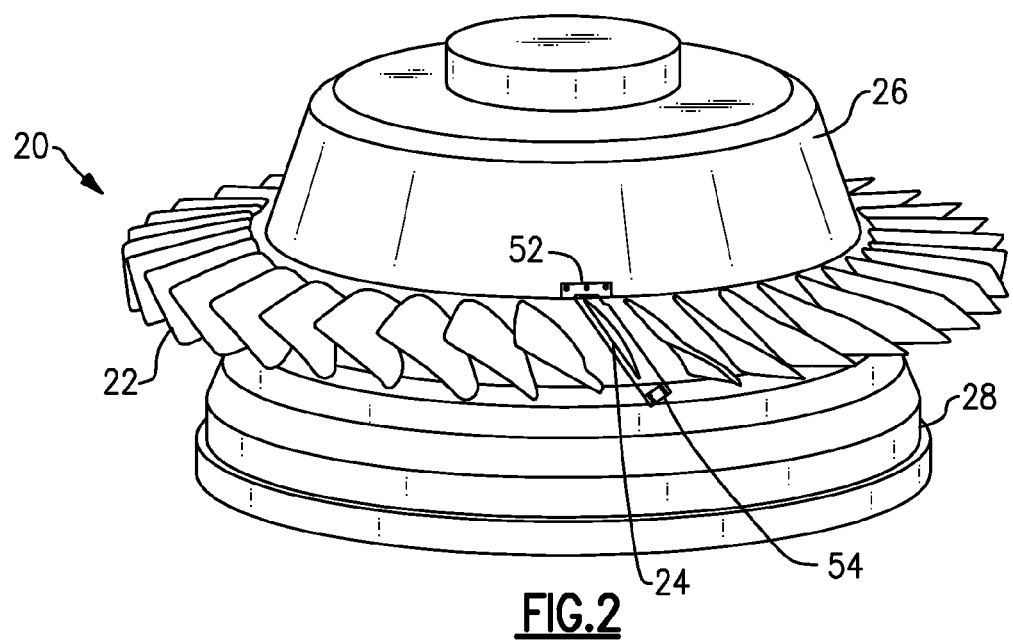
FIG. 2 shows a linear friction welding apparatus for repairing an integrally bladed rotor.

Referring now to FIG. 2, there is depicted a linear friction welding apparatus 10 for repairing an integrally bladed rotor 20 including operational blades 22, and a blade stub 24 of a damaged blade from which the damaged airfoil section of the blade has been removed. The damaged blade stub 24 is to be repaired by bonding a replacement blade segment, i.e. a new airfoil section (not shown in FIG. 2), to the blade stub 24. The integrally blade rotor 20 is shown mounted in the linear friction welding apparatus 10 in position between a first holding portion 26 and a second holding portion 28, both of which are part of the superstructure of the linear friction welding apparatus 10. Generally, prior to placement of the integrally bladed rotor in the linear friction welding apparatus 10 the first step is to remove the damaged blade to a prescribed cut plane so as to remove the damaged segment of the blade airfoil and leave behind the blade stub 24. The segment of the blade to be removed may be removed by any non-abusive machining technique or combination of techniques, such as for example cutting, grinding, finishing, or other technique that does not damage the blade stub 24 and that leaves a prepared outboard surface on the blade stub 24 to which the replacement blade airfoil segment may be suitably bonded using the linear friction welding apparatus 10.

Figure 3:
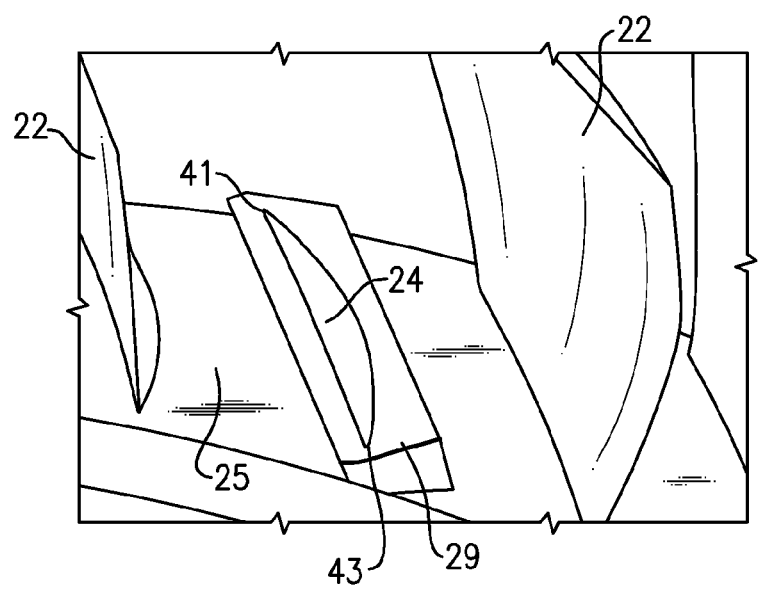
FIG. 3 shows a detail of the FIG. 1 system.

As shown in FIG. 3, the stub 24 is provided with a consumable collar 29. The consumable collar may be made of the same material as the rotor and blade, and is formed to have an internal cavity that is about the same size and shape of the blade stub in question. Rather than being formed of the same material, the collar could also be made of a different material, depending on engineering requirements. It is desirable that the maximum gaps between the cavity in the collar and the outer periphery of the blade be small (e.g., 0.04 inch, 1.02 mm, or less).

Figure 4:
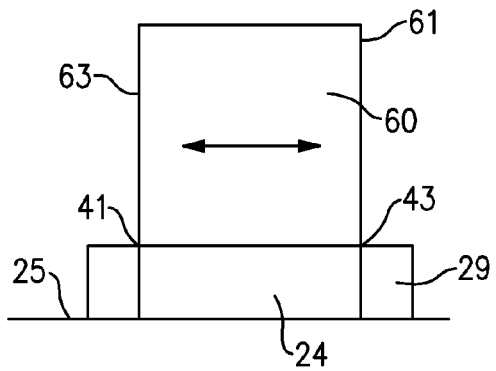
FIG. 4 schematically shows a linear friction welding operation.

As shown in FIG. 3, the collar 29 is mounted on the blade stub 24. The blade stub 24 extends between a leading edge 41 and a trailing edge 43. The collar 29 supports the blade stub 24 as a linear friction welding operation, explained schematically with reference to FIG. 4, is performed. In particular, as shown in FIG. 4, the linear friction welding includes moving a replacement blade segment, for example new airfoil blank 60 (having a leading edge 63 and a trailing edge 61), rapidly relative to the blade stub 24, with an axial compressive force, and in a direction generally parallel to a dimension between the leading and trailing edges. By moving the airfoil 60 and blade stub 24 rapidly relative to each other, heat is built up, and the two sections weld together in the solid state. Generally, the replacement blade segment is wrought, as opposed to cast, as a wrought replacement blade segment has a more desired grain structure and wrought OEM (original equipment manufacture) properties. The linear friction welding technique is known.

In the prior art, there has been little support at the leading edge and trailing edge portions, which come to very fine points in production blades. Thus, there have been challenges at performing linear friction welding, and particularly at the leading and trailing edges of a blade stub which does not have sufficient cross-sectional area to be structurally stiff and stationary during linear friction welding. As an example, the prior art had two unconnected collar portions at the leading and trailing edges. This did not provide adequate support. The lack of structural support during the linear friction welding process has particularly been an issue in the prior art when attempting to repair relatively small and/or relatively thin blades on integrally bladed rotors designed for placement in the aft stages of the compressor of a gas turbine engine.

As can be appreciated from FIG. 4, the collar 29 provides additional structural support during the linear friction welding, and thus results in a robust reliable bond being formed between the airfoil 60 and the blade stub 24. To provide additional radial support during the linear friction welding process, the lower surface 31 of the collar 29 may be contoured to fit and mate with a portion of the outer circumferential surface 25 of the integrally bladed rotor 20.

Figure 5:
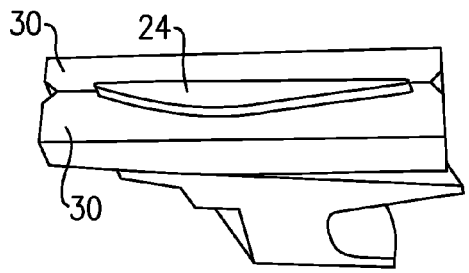
FIG. 5 shows an embodiment of a collar according to this application.
Figure 6:
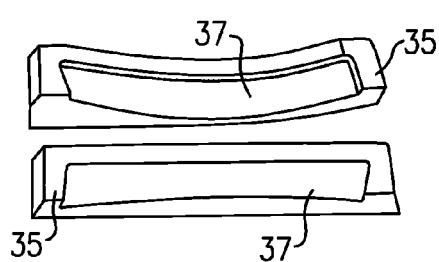
FIG. 6 shows another embodiment.

As shown in FIG. 5, the collar can be provided by two separate portions 30 which when assembled fit around the blade stub 24. As shown in FIG. 6, the collar may have portions 35 with an internal cavity 37 that actually extends above the blade stub 24. In this embodiment, there will be material from the collar actually sitting between the blade stub and the airfoil blank in the final repaired rotor. It is to be understood, however, that, if the design of the blade permits, the collar 29 may be a single-piece collar defining an internal cavity, having a continuous inner perimeter surface, that can be slipped over the blade stub 24 prior to commencement of the bonding step and can also be removed from the repaired blade.

Figure 7:
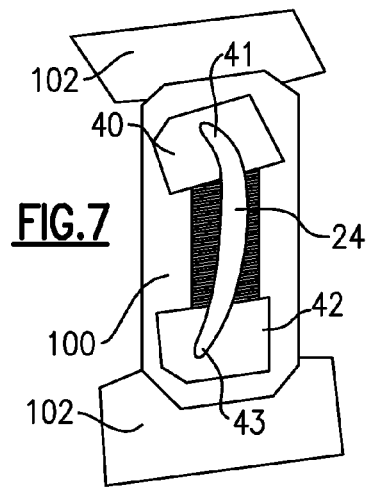
FIG. 7 shows yet another embodiment.

As shown in FIG. 7, it is also possible for the collar to be formed of separate portions 40 and 42 only supporting the leading and trailing edges 41 and 43. As shown, the two sub-collars support the edges, with unsupported portions at the outer circumference of the stub allowed between the two sub-collar portions 40 and 42. Thus, a collar holder 100 connects the leading and trailing edge sub-collar portions 40 and 42. In addition, tooling 102 may be provided to hold the collar support 100.

In general, the collars are provided at both the leading and trailing edges of the airfoil. Some structure interconnects those collar sub-portions. In some embodiments (FIGS. 3, 5, and 6), the collar integrally connects the two. In other embodiments (FIG. 7), there are two separate collar sub-portions that are connected together by a collar holding member. The collar may have enlarged regions about the leading and trailing edges of the airfoil for additional structural support. Further, the collar may have sufficient height to exceed the prescribed linear friction weld "burn-off" or to ensure that the collar itself will be at least partially consumed during the linear friction welding operation.

In the method as herein provided for replacing a damaged rotor blade on an integrally bladed rotor, after the damaged portion of the damaged blade has been removed leaving a blade stub 24 extending outwardly from the radially outboard surface 25 of the rotor disk 20 and prior to attaching an undamaged replacement blade segment to the blade stub 24 by a bonding operation in the linear friction welding apparatus 10, the rotor disk 20 is disposed in the linear friction welding apparatus 10 between the first holding portion 26 of the linear friction welding apparatus and the second holding portion 28 of the linear friction welding apparatus, as illustrated in FIG. 2. A support collar defining an internal cavity adapted to receive the blade stub 24 in supporting relationship is provided and disposed in supporting relationship about the blade stub 24.

Figure 8:
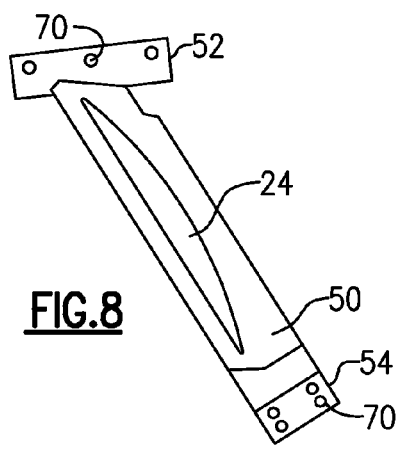
FIG. 8 shows a collar secured to the linear friction welding machine apparatus.

As illustrated in FIGS. 2 and 8, with the support collar 50 in position about the blade stub 24, the support collar is secured to the linear friction welding apparatus 10. In the embodiment depicted therein, a first end of the support collar 50 is secured to the first holding portion 26 of the linear friction welding apparatus 10 and a second end of the support collar 50 is secured to the second holding portion 28 of the linear friction welding apparatus 10. For example, each end of the collar 50 may secured to its respective holding portion 26, 28 by means of jigs 52, 54, respectively, adapted to receive a respective end of the collar 50 and to be secured to the holding portions 26, 28, respectively, by removable fasteners, such as bolts 70.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention. For example, persons of skill in the art will recognize that although described with respect to a linear friction welding process, the method and apparatus of the invention may be applicable, with or without modification, to other metallurgical bonding processes.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A method for repairing an integrally bladed rotor having a plurality of blades extending outwardly from a rotor disk and including a blade having a damaged portion, the integrally blade rotor having been manufactured without using linear friction welding to join the plurality of blades to a rotor disk, the method comprising the steps of:
    removing a damaged portion of the damaged blade leaving a blade stub extending outwardly from the rotor disk;
    supporting a leading edge and a trailing edge of the blade stub with separate leading and trailing edge sub-collar portions;
    connecting the sub-collar portions with a collar holder; and
    performing a linear friction welding operation to attach a replacement blade segment to the blade stub.

2. A method for repairing a damaged rotor blade on an integrally bladed rotor using a linear friction welding apparatus, the rotor having a disk and a plurality of blades extending outwardly from the disk, the method comprising steps of:
    by removing a damaged portion of the damaged blade leaving a blade stub extending outwardly from the rotor disk;
    disposing the rotor disk in a linear friction welding apparatus between a first holding portion of the linear friction welding apparatus and a second holding portion of the linear friction welding apparatus;
    providing a leading edge sub-collar portion to support a leading edge of the blade stub, and a trailing edge sub-collar portion to support a trailing edge of the blade stub;
    providing a support collar defining an internal cavity adapted to receive the blade stub in supporting relationship and connect the leading and trailing edge sub-collar portions;
    disposing the leading and trailing edge sub-collar portions in supporting relationship about the leading and trailing edges;
    disposing the support collar in supporting relationship about the blade stub and the leading and trailing edge sub-collar portions;

securing the support collar to the linear friction welding apparatus; and performing a linear friction welding operation to attach a replacement blade segment to the blade stub.

3. The method as recited in claim 2 wherein the step of securing the support collar to the linear friction welding apparatus comprises securing a first end of the support collar to the first holding portion of the linear friction welding apparatus and securing a second end of the support collar to the second holding portion of the linear friction welding apparatus.

4. The method as recited in claim 2 further comprising providing a support collar having a lower surface contoured to mate with a portion of an outer circumferential surface of the rotor disk.

5. The method as recited in claim 2 wherein the step of disposing the support collar in supporting relationship about the blade stub comprises slipping a single-piece support collar over the blade stub whereby the blade stub is received into the internal cavity of the support collar.

* * * * *